*(12)* United States Patent
Seo et al.

(10) Patent No.: US 11,555,124 B2
(45) Date of Patent: Jan. 17, 2023

(54) OPTICAL FILM AND IMAGE DISPLAY DEVICE INCLUDING SAME

(71) Applicant: LG CHEM, LTD., Seoul (KR)

(72) Inventors: Jung Hyun Seo, Daejeon (KR); Yeong Rae Chang, Daejeon (KR); Jin Young Park, Daejeon (KR); Han Na Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/340,723

(22) PCT Filed: Dec. 12, 2017

(86) PCT No.: PCT/KR2017/014573
§ 371 (c)(1),
(2) Date: Apr. 10, 2019

(87) PCT Pub. No.: WO2018/110950
PCT Pub. Date: Jun. 21, 2018

(65) Prior Publication Data
US 2019/0317255 A1     Oct. 17, 2019

(30) Foreign Application Priority Data

Dec. 12, 2016  (KR) ..................... 10-2016-0168858
Dec. 11, 2017  (KR) ..................... 10-2017-0169719

(51) Int. Cl.
| | | |
|---|---|---|
| *G02B 1/111* | (2015.01) | |
| *C09D 4/00* | (2006.01) | |
| *C09D 7/40* | (2018.01) | |
| *C08J 7/04* | (2020.01) | |
| *C09D 5/00* | (2006.01) | |
| *C09D 135/02* | (2006.01) | |
| *C09D 175/14* | (2006.01) | |
| *G02B 1/04* | (2006.01) | |
| *G02B 5/02* | (2006.01) | |
| *C09D 175/16* | (2006.01) | |
| *C08J 7/043* | (2020.01) | |
| *C08J 7/046* | (2020.01) | |

(52) U.S. Cl.
CPC ............... *C09D 4/00* (2013.01); *C08J 7/042* (2013.01); *C08J 7/043* (2020.01); *C08J 7/046* (2020.01); *C09D 5/002* (2013.01); *C09D 5/006* (2013.01); *C09D 7/67* (2018.01); *C09D 7/68* (2018.01); *C09D 135/02* (2013.01); *C09D 175/14* (2013.01); *C09D 175/16* (2013.01); *G02B 1/04* (2013.01); *G02B 1/111* (2013.01); *G02B 5/0226* (2013.01); *C08J 2367/02* (2013.01); *C08J 2435/02* (2013.01); *C08J 2475/14* (2013.01)

(58) Field of Classification Search
CPC .. G02B 1/11; G02B 1/111; G02B 1/14; C09D 175/14; C09D 175/16; C09D 135/02; C09D 5/006; C09D 7/42; C09D 7/67
See application file for complete search history.

(56) References Cited

U.S. PATENT DOCUMENTS

| | | | |
|---|---|---|---|
| 2003/0112520 A1* | 6/2003 | Takahashi | C08L 33/10 359/603 |
| 2004/0018349 A1* | 1/2004 | Reilly | G02B 1/11 428/221 |
| 2005/0048262 A1* | 3/2005 | Nakagawa | H01B 1/08 428/522 |
| 2005/0255291 A1 | 11/2005 | Iwata et al. | |
| 2006/0182945 A1* | 8/2006 | Yoneyama | G02B 5/3033 428/304.4 |
| 2006/0286381 A1* | 12/2006 | Naito | G02B 1/11 428/411.1 |
| 2008/0218865 A1 | 9/2008 | Iwata et al. | |
| 2009/0002831 A1 | 1/2009 | Mikami et al. | |
| 2009/0009863 A1* | 1/2009 | Nakamura | G02B 1/111 359/485.01 |
| 2009/0021834 A1 | 1/2009 | Iwata et al. | |
| 2009/0142561 A1* | 6/2009 | Zhang | C08J 7/043 428/212 |
| 2009/0268299 A1 | 10/2009 | Furui et al. | |
| 2010/0238558 A1* | 9/2010 | Im | G02B 1/118 524/502 |
| 2010/0283944 A1 | 11/2010 | Kodama et al. | |
| 2010/0296167 A1 | 11/2010 | Kourtakis et al. | |
| 2011/0255169 A1 | 10/2011 | Kang et al. | |

(Continued)

FOREIGN PATENT DOCUMENTS

| | | |
|---|---|---|
| CN | 101779146 A | 7/2010 |
| CN | 103364849 A | 10/2013 |
| CN | 106030349 A | 10/2016 |

(Continued)

OTHER PUBLICATIONS

Product data sheet on Cosmoshine A4100, from Toyobo.*
Product data sheet on Cosmoshine A4300, from Toyobo.*
Machine translation of WO 2016/076302 A1, obtained from EspaceNet.*
European Search Report issued for European Patent Application No. 17881072.7 dated Sep. 4, 2019, 7 pages.

(Continued)

*Primary Examiner* — Z. Jim Yang

(74) *Attorney, Agent, or Firm* — Rothwell, Figg, Ernst & Manbeck, P.C.

(57) ABSTRACT

The present invention relates to an optical film including a light-transmitting substrate film such as a polyester-based substrate film and an antiglare layer, and more specifically, to an optical film capable of effectively suppressing the occurrence of interference fringes derived from the substrate film, realizing excellent antiglare properties, and having excellent scratch resistance, and excellent adhesion between the substrate film and the antiglare layer, and the like, and to an image display device including the same.

15 Claims, No Drawings

(56) References Cited

U.S. PATENT DOCUMENTS

| | | | |
|---|---|---|---|
| 2012/0002282 A1* | 1/2012 | Nagahama | G02B 5/0226 359/488.01 |
| 2012/0141736 A1* | 6/2012 | Hotta | C09D 7/65 428/141 |
| 2012/0321874 A1 | 12/2012 | Shim | |
| 2013/0100378 A1 | 4/2013 | Murata et al. | |
| 2013/0216819 A1 | 8/2013 | Kim et al. | |
| 2013/0258481 A1* | 10/2013 | Fukuda | C09D 7/62 427/164 |
| 2013/0279155 A1 | 10/2013 | Kuroda et al. | |
| 2014/0044891 A1* | 2/2014 | Shibata | G02B 1/08 428/1.31 |
| 2014/0127465 A1* | 5/2014 | Shim | G02B 1/111 427/517 |
| 2014/0128533 A1* | 5/2014 | Vanmeulder | C08F 2/46 524/507 |
| 2014/0168757 A1* | 6/2014 | Kim | B29D 11/0074 359/601 |
| 2014/0184994 A1* | 7/2014 | Kuroda | B29C 48/08 349/96 |
| 2014/0211316 A1 | 7/2014 | Furui et al. | |
| 2014/0254020 A1* | 9/2014 | Sakajiri | G02B 5/0221 359/601 |
| 2014/0268349 A1* | 9/2014 | Kalyankar | G02B 5/0294 427/164 |
| 2014/0340755 A1 | 11/2014 | Eguchi et al. | |
| 2014/0349130 A1* | 11/2014 | Petcavich | G02B 1/14 428/480 |
| 2015/0092276 A1* | 4/2015 | Miyake | G02B 5/0242 359/599 |
| 2018/0179395 A1* | 6/2018 | Seo | C09D 135/02 |
| 2018/0258315 A1* | 9/2018 | Roller | C08G 18/73 |
| 2019/0233560 A1* | 8/2019 | Siband | C08F 2/46 |

FOREIGN PATENT DOCUMENTS

| | | | | |
|---|---|---|---|---|
| JP | 2010256850 A | * | 11/2010 | ............ B32B 7/02 |
| JP | 2013-238867 A | | 11/2013 | |
| JP | 2014016602 A | | 1/2014 | |
| JP | 2015-210273 A | | 11/2015 | |
| KR | 10-2010-0075024 A | | 7/2010 | |
| KR | 10-2011-0018286 A | | 2/2011 | |
| KR | 20110095820 A | | 8/2011 | |
| KR | 101189196 B1 | | 10/2012 | |
| KR | 101202050 B1 | | 11/2012 | |
| KR | 101205252 B1 | | 11/2012 | |
| KR | 10-2013-0010445 A | | 1/2013 | |
| KR | 101296825 B1 | | 8/2013 | |
| KR | 101392301 B1 | | 4/2014 | |
| KR | 101408637 B1 | | 6/2014 | |
| KR | 20140072859 A | | 6/2014 | |
| KR | 20140079876 A | | 6/2014 | |
| WO | WO-2011082965 A2 | * | 7/2011 | ............ C08L 33/08 |
| WO | WO-2015145618 A1 | * | 10/2015 | ............ C08F 2/44 |
| WO | WO-2016076302 A1 | * | 5/2016 | ............ B32B 27/34 |

OTHER PUBLICATIONS

International Search Report and Written Opinion issued for International Application No. PCT/KR2017/015473 dated Mar. 30, 2018, 11 pages.

* cited by examiner

OPTICAL FILM AND IMAGE DISPLAY DEVICE INCLUDING SAME

CROSS-REFERENCE TO RELATED APPLICATION(S)

This application is a 35 U.S.C. § 371 National Phase Entry Application from PCT/KR2017/014573, filed on Dec. 12, 2017, and designating the United States, which claims the benefit of filing dates of Korean Patent Application No. 10-2016-0168858 filed with Korean Intellectual Property Office on Dec. 12, 2016 and Korean Patent Application No. 10-2017-0169719 filed with Korean Intellectual Property Office on Dec. 11, 2017, the entire contents of which are incorporated herein by reference.

TECHNICAL FIELD

The present invention relates to an optical film including a light-transmitting substrate film such as a polyester-based substrate film and an antiglare layer, and more specifically, to an optical film capable of effectively suppressing the occurrence of interference fringes derived from the substrate film, realizing excellent antiglare properties, and having excellent scratch resistance, and excellent adhesion between the substrate film and the antiglare layer, and the like, and to an image display device including the same.

BACKGROUND

In an image display device such as an organic light emitting diode (OELD) or a liquid crystal display (LCD), it is required to prevent a decrease in contrast due to a reflection of external light or a reflection of an image, and a deterioration of the visibility. For this purpose, in order to reduce a reflection of an image and a reflection of light by using scattering of light or optical interference, an optical laminated film such as an antireflection film is formed on the surface of the image display device.

For example, in a liquid crystal display or the like, an optical laminated film including an antiglare layer has been generally formed. Such an antiglare layer mainly includes a binder and fine particles contained in the binder, and these fine particles are usually formed so that a part thereof protrudes on the surface of the binder. That is, the antiglare layer allows the fine particles protruding on the surface of the binder to control light scattering/light reflection, thereby suppressing deterioration of the visibility of the image display device.

However, in the case of previously known antiglare layers and optical films, the gloss value of the surface is often high and it is difficult to suppress the reflection of external light. Consequently, it is impossible to sufficiently suppress a decrease in the contrast of the image display device or the like. In addition, in the previous antiglare layers and optical films, as the crosslinking density of the binder and the like are not sufficient, scratch resistance of the surface is often insufficient.

On the other hand, the previously known optical films generally have a shape in which an antiglare layer is formed on a light-transmitting substrate film. As such a light-transmitting substrate film, a cellulose ester-based film typified by triacetyl cellulose (TAC) is most widely used. Such a cellulose ester-based film has advantages in that transparency and optical isotropy are excellent, the in-plane retardation is hardly represented, and thus interference fringes are not generated and the display quality of the display device is not adversely affected.

However, the cellulose ester-based film not only is a material which is disadvantageous in terms of cost, but also has disadvantages that it has a high moisture permeability and poor water resistance. Due to such high moisture permeability and poor water resistance, a considerable amount of water permeation occurs continuously during use, and floating phenomenon may occur, thereby causing light leakage.

Due to the disadvantages of these cellulose ester-based films, attempts have been recently made to replace and apply polyester-based films such as polyethylene terephthalate-based films as a substrate film of the optical film for protecting a polarizer. Such a polyester-based film is inexpensive and has excellent water resistance, and thus there is almost no possibility of causing light leakage phenomenon, it has excellent mechanical properties.

However, such a polyester-based film has a disadvantage in that it contains an aromatic ring having a high refractive index in the structure, and it exhibits an anisotropy due to a difference in elongation in the MD/TD direction or the like in the process of the film formation. As a result, when the above polyester-based film is applied as a substrate film of an optical film, interference fringes due to transmission/reflection of light are occurred, and the visibility of the display device is deteriorated.

In addition, the antiglare layer formed on the light-transmitting substrate film usually includes a (meth)acrylate-based binder, and when the above polyester-based film is applied as a substrate film of an optical film, adhesion between the substrate film and the antiglare layer is often not sufficient.

Technical Problem

In this regard, it is an object of the present invention to provide an optical film comprising a substrate layer and an antiglare layer, wherein the optical film can effectively suppress the occurrence of interference fringes derived from the substrate film, can realize excellent antiglare properties, and has excellent scratch resistance, and excellent adhesion between the substrate film and the antiglare layer.

It is another object of the present invention to provide an image display device comprising the above-mentioned optical film.

Technical Solution

The present invention provides an optical film comprising:
a polyester-based substrate film; and
an antiglare layer including a binder containing a (meth)acrylate-based crosslinked polymer, and organic fine particles of a micron (μm) scale dispersed on the binder and inorganic fine particles of a nanometer (nm) scale dispersed on the binder,
wherein the (meth)acrylate-based crosslinked polymer is a crosslinked polymer of 0 to 20 parts by weight of a monofunctional (meth)acrylate-based compound based on 100 parts by weight of the binder, and a polyfunctional (meth)acrylate-based compound with three or more functionalities,
wherein an absolute value of the refractive index difference between the organic fine particles and the binder is less than 0.15, and an absolute value of the refractive index difference between the inorganic fine particles and the binder is less than 0.15, and wherein the surface of the antiglare layer has a 20-degree gloss value of 50% to 70% and a 60-degree gloss value of 75% to 90%.

The present invention also provides an optical film comprising:

a light-transmitting substrate film; and an antiglare layer which is formed on the substrate film and includes a binder containing a (meth)acrylate-based crosslinked polymer, and one or more fine particles having a sub-micron (sub-μm) scale dispersed on the binder, wherein the (meth)acrylate-based crosslinked polymer is a crosslinked polymer of 0 to 20 parts by weight of a monofunctional (meth)acrylate-based compound based on 100 parts by weight of the binder, and a polyfunctional (meth)acrylate-based compound with three or more functionalities, wherein an absolute value of the refractive index difference between the fine particles and the binder of the antiglare layer is less than, and wherein the polyfunctional (meth)acrylate-based compound includes a monomolecular type (meth)acrylate-based compound with three to six functionalities; and/or a polyurethane-based polymer, a poly(meth)acryl-based polymer, or a polyester-based polymer, each polymer having a (meth) acrylate-based functional group with ten or more functionalities.

In addition, the present invention provides an image display device comprising the optical film.

Hereinafter, the optical film and the image display device according to specific embodiments of the present invention will be described in detail.

As used herein, the micron (μm) scale refers to having a particle size or particle diameter of less than 1 mm, i.e., less than 1000 μm, the nano (nm) scale refers to having a particle size or particle diameter of less than 1 μm, i.e., less than 1000 nm, and the sub-micron (sub-μm) scale refers to having a particle size or particle diameter of micron scale or nanoscale.

Further, the photopolymerizable compound is collectively referred to as a compound that causes cross-linking, curing, or polymerization when it is irradiated with light, for example, when it is irradiated with visible light or ultraviolet light.

Further, the (meth)acrylate refers to including both acrylate and methacrylate.

Further, the (co)polymer refers to including both a copolymer and a homopolymer.

Further, the hollow silica particles refer to silica particles which are derived from a silicon compound or an organic silicon compound and have an empty space on the surface and/or inside thereof.

According to one embodiment of the present invention, there is provided an optical film comprising:

a polyester-based substrate film; and an antiglare layer including a binder containing a (meth) acrylate-based crosslinked polymer, and organic fine particles of a micron (μm) scale dispersed on the binder and inorganic fine particles of a nanometer (nm) scale dispersed on the binder, wherein the (meth)acrylate-based crosslinked polymer is a crosslinked polymer of 0 to 20 parts by weight of a monofunctional (meth)acrylate-based compound, based on 100 parts by weight of the binder, and a polyfunctional (meth)acrylate-based compound with three or more functionalities, wherein an absolute value of the refractive index difference between the organic fine particles and the binder is less than 0.15, and an absolute value of the refractive index difference between the inorganic fine particles and the binder is less than 0.15, and wherein the surface of the antiglare layer has a 20-degree gloss value of 50% to 70% and a 60-degree gloss value of 75% to 90%.

It has been found by the present inventors that by containing one or more fine particles such as organic and inorganic fine particles having a particle size of a predetermined scale together with a (meth)acrylate-based binder in the antiglare layer, and also by controlling the difference between the refractive index of the binder and the refractive index of respective fine particles to be less than 0.15, for example, 0 to 0.12, or 0.01 to 0.12, or 0.02 to 0.12, antiglare properties of the antiglare layer and the optical film can be improved.

This is presumably because, by controlling the difference in refractive index between the fine particles and the binder within the above-mentioned range, the gloss value of the surface of the antiglare layer can be reduced, and thereby, the reflection of external light can be effectively controlled. Moreover, it has been found that due to such a refractive index control, a reduction in gloss value and the like, the occurrence of interference fringes derived from the light-transmitting substrate film such as the polyester-based substrate film can be effectively suppressed.

In addition, in the optical film of one embodiment, the (meth)acrylate-based binder is a crosslinked (co)polymer of 0 to 20 parts by weight of a monofunctional (meth)acrylate-based compound based on 100 parts by weight of the total binder, and a polyfunctional (meth)acrylate-based compound with three or more functionalities. More specifically, the polyfunctional (meth)acrylate-based compound with three to six functionalities is a crosslinked (co)polymer of a monomolecular type (meth)acrylate-based compound with three to six functionalities and a compound (polymer) having a (meth)acrylate-based functional group with ten or more. In this way, it has been found that by using a binder in which a reduced content of the monofunctional (meth) acrylate-based compound and a relatively large content of a polyfunctional (meth)acrylate-based compound with three or more functionalities, particularly, a polyfunctional compound containing 10 or more functional compound, are crosslinked/(co)polymerized, the adhesion between the substrate and the antiglare layer of the optical film can be improved, and the scratch resistance of the optical film can be improved. This is presumably because the crosslink density and hardness of the binder are further increased by using the binder described above. Furthermore, with the use of such a specific binder, the gloss value of the surface of the antiglare layer can be further reduced. As a result, it was confirmed that the reflection of external light can be more effectively controlled. Therefore, the occurrence of the interference fringes derived from the light-transmitting substrate film such as the polyester-based substrate film, can be further suppressed.

Thus, the optical film of one embodiment can exhibit excellent scratch resistance while improving the visibility and the like of the image display device.

Hereinafter, the optical film of one embodiment of the invention will be described specifically for each component.

The optical film of one embodiment includes a light-transmitting substrate film exhibiting light transmittance to at least visible light, and representative examples thereof include a polyester-based substrate film. As the polyester-based substrate film, a film containing any polyester resin previously known to be applicable as a substrate film of an optical film can be applied without particular limitation.

However, in consideration of excellent mechanical properties and water resistance of the substrate film, the polyester-based substrate film is preferably a polyethylene terephthalate (PET) based film having a thickness of 30 to 200 or 40 to 150 μm.

In addition, the optical film of one embodiment includes an antiglare layer formed on the substrate film. As already described above, by controlling the composition and the refractive index of the binder contained in the antiglare layer, and the difference between the refractive index of the fine particles contained therein and the refractive index of the binder, the antiglare properties and scratch resistance of the antiglare layer and the optical film can be excellently expressed, In this antiglare layer, the binder may be a (co)polymer of 0 to 20 parts by weight, or 0 to 18 parts by weight, or 3 to 17 parts by weight of a monofunctional (meth)acrylate-based compound, and a residual polyfunctional (meth)acrylate-based compound. In a more specific example, as the polyfunctional (meth)acrylate-based compound having a (meth)acrylate group with three or more functionalities, a monomolecular type (meth)acrylate-based compound with three to six functionalities and/or a polyurethane-based polymer, a poly(meth)acryl-based polymer, or a polyester-based polymer, each polymer having a (meth)acrylate-based functional group with ten or more functionalities, may be used.

By virtue of the composition of such a binder, the difference between the refractive index of the binder and the refractive index of the fine particles can be controlled to a more appropriate level. In addition, the haze properties of the antiglare layer and the optical film can be maintained at an appropriate level, and it can contribute to further improve the image sharpness. If only the monomolecular type (meth)acrylate-based compound with three to six functionalities is used, the haze properties may deviate from an appropriate range, or the image sharpness may be degraded.

Examples of the monofunctional (meth)acrylate-based compound include o-phenylphenoxyethyl acrylate ("OPPEA"), a monomolecular type compound having one (meth)acrylate-based functional group and an aromatic ring, and a hydroxy (meth)acrylate-based compound including 2-hydroxyethyl acrylate.

Specific examples of the monomolecular type (meth)acrylate-based compound with three to six functionalities include a monomolecular type compound having 3 to 6 (meth)acrylate functional groups per molecule, and an aromatic ring (e.g., UA-306T as used in Examples below, etc.), pentaerythritol tri(meth)acrylate, trialkylolpropane tri(meth)acrylate or the like.

Further, as the polyurethane-based polymer, the poly(meth)acryl-based polymer, or the polyester-based polymer, having a (meth)acrylate-based functional group with ten or more functionalities, a polymer in which an average of 10 to 80 or an average of 10 to 50 (meth)acrylate-based functional groups are bonded to the backbone of the polyurethane-based polymer, poly(meth)acryl-based polymer or polyester-based polymer, can be used, and these polymers may have a weight average molecular weight of 1000 to 200000.

Further, the monomolecular type (meth)acrylate-based compound with three to six functionalities, and the polymer having a (meth)acrylate-based functional group with ten or more functionalities may be used, for example, in a weight ratio of 1:1 to 10:1.

As a binder in the crosslinked (co)polymer form is obtained using the above-mentioned composition, the refractive index of the binder is controlled within a suitable range of, for example, 1.50 to 1.60, 1.50 to 1.56, or 1.51 to 1.55, so that the difference in refractive index between the fine particles contained in the antiglare layer and the binder can be more effectively controlled, the external reflection of the antiglare layer and the optical film is reduced, and the haze properties and image sharpness can be further improved.

Meanwhile, the antiglare layer contains one or more fine particles of a sub-micron (sub-μm) scale dispersed on the binder, for example, organic fine particles of a micron (μm) scale and inorganic fine particles of a nano (nm) scale. As each of these fine particles has a refractive index such that the absolute value of the refractive index difference between the particles and the above-mentioned binder is less than 0.15, the antiglare layer can exhibit low gloss value and excellent antiglare properties, and the interference fringes derived from the substrate film can be reduced.

As the organic fine particles, resin particles previously known to be usable in the antiglare layer and the like can be used without particular limitation, and specific examples thereof include resin fine particles containing polystyrene-based resin, poly(meth)acrylate-based resin or poly(meth)acrylate-co-styrene copolymer resin.

Further, such organic fine particles are, for example, spherical particles having a particle diameter of 1 to 5 μm or 1.5 to 4 μm, which may be those having a refractive index of 1.5 to 1.57, or 1.53 to 1.57, or 1.54 to 1.56.

As the inorganic fine particles, metal oxide fine particles including silica, alumina, zirconia or titania may be used. For example, they are spherical particles having a particle diameter of 10 nm to 300 nm, or 50 to 200 nm, which may be those having a refractive index of 1.4 to 1.75, or 1.4 to 1.65, or 1.42 to 1.48, or 1.42 to 1.45.

Such one or more fine particles, for example, the above-mentioned organic and inorganic fine particles, may be respectively contained in an amount of 0.1 to 10 parts by weight, or 0.2 to 8 parts by weight, based on total 100 parts by weight of the antiglare layer.

The antiglare layer may have a thickness of 1 to 10 μm, or 2 to 8 μm, and each of the above-mentioned fine particles may be dispersed in the antiglare layer, or can suppress reflection or scattering of external light in a state where at least thereof is protruded, The antiglare layer formed with the above composition and thickness can appropriately suppress the scattering or reflection of external light and thus can have excellent antiglare properties. Further, not only its surface exhibits excellent scratch resistance, but also it can effectively suppress the interference fringes derived from the substrate film. The excellent optical properties of such an antiglare layer can be defined by the low gloss value of its surface. For example, the antiglare layer may have a 20-degree gloss of 50% to 70%, or 58% to 68%, or 59% to 66% and a 60-degree gloss value of 75% to 90%, or 80% to 88%, or 83% to 87%.

Meanwhile, the above-mentioned antiglare layer can be formed by a composition comprising a photopolymerizable compound including a (meth)acrylate-based compound having the above-mentioned constitution, a photoinitiator, and an organic solvent.

In such composition, as the photoinitiator, conventionally known photoinitiators can be used without particular limitation. Examples of the photoinitiator may be one selected among 1-hydroxycyclohexyl phenyl ketone, benzyl dimethyl ketal, hydroxydimethylacetophenone, benzoin, benzoin methyl ether, benzoin ethyl ether, benzoin isopropyl ether, and benzoin butyl ether, or a mixture of two or more thereof.

At this time, the photoinitiator may be added in an amount of 0.1 to 10 parts by weight based on 100 parts by weight of the photopolymerizable compound of the (meth)acrylate-based compound. When the amount of the photoinitiator is less than 0.1 part by weight relative to 100 parts by weight of the photopolymerizable compound, sufficient photo-curing due to ultraviolet irradiation may not occur. When the amount of the photoinitiator exceeds 10 parts by weight relative to 100 parts by weight of the photopolymerizable compound, the adhesion between the antiglare layer and the substrate film or the like may be deteriorated. Furthermore, when the photoinitiator is contained in an excessively large amount, the antiglare layer and the optical film including the same may show yellowing due to the unreacted initiator with the lapse of time, so that the optical properties of the optical film may be deteriorated.

Further, the composition may further comprise an organic solvent. When such an organic solvent is added, its constitution is not limited, but in consideration of ensuring an appropriate viscosity of the composition and the film strength of the finally formed film, the organic solvent may be used in an amount of preferably 50 to 700 parts by weight, more preferably 100 to 500 parts by weight, and most preferably 150 to 450 parts by weight based on 100 parts by weight of the photopolymerizable compound.

In this case, the type of usable organic solvent is not particularly limited, but one selected from the group consisting of lower alcohols having 1 to 6 carbon atoms, acetates, ketones, cellosolve, dimethylformamide, tetrahydrofuran, propylene glycol monomethyl ether, toluene and xylene, and mixtures of at least one thereof may be used.

At this time, examples of the lower alcohol may be methanol, ethanol, isopropyl alcohol, butyl alcohol, isobutyl alcohol, diacetone alcohol, and the like. Further, the acetates may be methyl acetate, ethyl acetate, isopropyl acetate, butyl acetate, or cellosolve acetate, and the ketones may be methyl ethyl ketone, methyl isobutyl ketone, acetylacetone, or acetone.

Meanwhile, the composition for forming the antiglare layer may further include at least one additive selected from the group consisting of a dispersant, a leveling agent, a wetting agent, a defoaming agent, and an antistatic agent. In this case, the additive may be added within the range of 0.01 to 10 parts by weight based on 100 parts by weight of the binder-forming compound.

The antiglare layer may be formed by coating the above-mentioned composition onto one surface of the light-transmitting substrate film such as polyester-based substrate film, followed by drying and photo-curing. These drying and photo-curing conditions may be in accordance with the conditions of a general process for forming the antiglare layer, and specific process conditions are also described in Examples provided hereinafter.

Meanwhile, the optical film of one embodiment described above may further include a primer layer which is formed between the substrate film and the antiglare layer, and has a refractive index smaller than the refractive index of the substrate film and larger than a binder of the antiglare layer. By using such a primer layer, the adhesion between the substrate film and the antiglare layer can be further improved. Furthermore, by adjusting the refractive index of the primer layer to be smaller than that of the substrate film and larger than that of the antiglare layer, the difference in the refractive index between the adjacent layers is reduced, and the occurrence of interference fringes due to the polyester-based substrate film can be further reduced.

For this purpose, the primer layer may have a refractive index of 1.51 to 1.62. In order to achieve such a refractive index, it may include a binder layer containing a polymer resin or an organic compound, and high refractive index nanoparticles dispersed on the binder layer and having a refractive index of 1.57 or more. In this case, examples of applicable high refractive index nanoparticles include titania particles ($TiO_2$), zirconia particles ($Zr_2O_3$) or high-refractive-index nanosilica particles, having a diameter of 200 nm or less, or a diameter of 10 to 200 nm.

In addition, the primer layer may have a thickness of, for example, 20 nm to 500 nm, or 30 nm to 500 nm, or 30 to 300 nm, in order not to inhibit the interference suppression effect (interference offset effect) depending on the thickness of the antiglare layer, while appropriately improving adhesion between the antiglare layer and the substrate film.

Except for the matters concerning the appropriate refractive index and thickness described above, the primer layer may be formed by applying an appropriate composition and process of the primer layer commonly applied to the optical film, and therefore, an additional description thereof will be omitted.

Meanwhile, the optical film of one embodiment described above may further include a low refractive index layer formed on the antiglare layer. Such a low refractive index layer includes a binder resin containing a (co)polymer of a photopolymerizable compound, and hollow silica particles dispersed in the binder resin.

By including such a low refractive index layer, the reflection itself in the light-transmitting substrate film such as the polyester-based substrate film can be reduced, and as a result, the occurrence of interference fringes can be further reduced in the optical films of one embodiment. Further, by using such a low refractive index layer, the diffuse reflection on the display surface of the image display device can be reduced, thereby further improving resolution and visibility.

The low refraction layer may have a refractive index of, for example, 1.3 to 1.5 and a thickness of 1 to 300 nm in order to effectively suppress the reflection in the substrate film or the diffuse reflection on the display surface of the display device.

Meanwhile, the low refractive index layer may be formed from a photo-curable coating composition for forming a low refractive index layer including a photopolymerizable compound and hollow silica particles. Specifically, the low refractive index layer may include a binder resin containing a (co)polymer of a photopolymerizable compound and hollow silica particles dispersed in the binder resin.

The photopolymerizable compound contained in the low refractive index layer may include a monomer or an oligomer containing a (meth)acrylate or vinyl group. Specifically, the photopolymerizable compound may include a monomer or an oligomer containing one or more, two or more, or three or more of (meth)acrylate or vinyl groups.

Specific examples of the monomer or oligomer containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof. Herein, the molecular weight of the oligomers is preferably 1,000 to 10,000.

Specific examples of the monomer or oligomer containing a vinyl group include divinylbenzene, styrene, and para-methyl styrene.

Meanwhile, the photo-curable coating composition for forming a low reflective index layer may further include a fluorine-based compound containing a photoreactive functional group. Accordingly, the binder resin of the low refractive index layer may include a cross-linked polymer of the photopolymerizable compound already described above and the fluorine-based compound containing the photoreactive functional group.

The fluorine-based compound containing the photoreactive functional group may include or be substituted with at least one photoreactive functional group, and the photoreactive functional group refers to a functional group which can participate in a polymerization reaction by irradiation of light, for example, by irradiation of visible light or ultraviolet light. The photoreactive functional group may include various functional groups known to be able to participate in a polymerization reaction by irradiation of light. Specific examples thereof include a (meth)acrylate group, an epoxide group, a vinyl group or a thiol group.

The fluorine-based compound containing the photoreactive functional group may have a fluorine content of 1 to 25% by weight. When the content of fluorine in the fluorine-based compound containing the photoreactive functional group is too small, it may be difficult to sufficiently secure the physical properties such as stain resistance or alkali resistance. In contrast, when the content of fluorine in the fluorine-based compound containing the photoreactive functional group is too large, the surface properties such as scratch resistance of the low refractive index layer may be deteriorated.

The fluorine-based compound containing the photoreactive functional group may further include silicon or a silicon compound. That is, the fluorine-based compound containing the photoreactive functional group may optionally contain silicon or a silicon compound therein.

The fluorine-based compound containing the photoreactive functional group may have a weight average molecular weight (weight average molecular weight in terms of polystyrene measured by GPC method) of 2,000 to 200,000. When the weight average molecular weight of the fluorine-based compound containing the photoreactive functional group is too small, the low refractive index layer obtained from the photo-curable coating composition of the embodiment may not have sufficient alkali resistance. Further, when the weight average molecular weight of the fluorine-based compound containing the photoreactive functional group is too large, the low refractive index layer obtained from the photo-curable coating composition of the embodiment above may not have sufficient durability and scratch resistance.

The photo-curable coating composition may contain 0.1 to 10 parts by weight of the fluorine-based compound containing the photoreactive functional group based on 100 parts by weight of the photopolymerizable compound of the monomer or oligomer containing the (meth)acrylate or vinyl group. When the fluorine-based compound containing the photoreactive functional group is added in excess relative to the photopolymerizable compound, the coating properties of the photo-curable coating composition may be reduced, or the low refractive index layer obtained from the photo-curable coating composition may not have sufficient durability or scratch resistance. In contrast, when the amount of the fluorine-based compound containing the photoreactive functional group is too small relative to the photopolymerizable compound, the low refractive index layer obtained from the photo-curable coating composition may not have sufficient alkali resistance.

Meanwhile, the hollow silica particles refer to silica particles which have a maximum diameter of less than 200 nm and have voids on the surface and/or inside thereof. The hollow silica particles may have a diameter of 1 to 200 nm, or 10 to 100 nm.

As for the hollow silica particles, silica particles whose surface is coated with a fluorine-based compound may be used either alone or in combination with silica particles whose surface is not coated with a fluorine-based compound. When the surface of the hollow silica particles is coated with a fluorine-based compound, the surface energy may be further reduced. Accordingly, the hollow silica particles may be more uniformly distributed in the photo-curable coating composition, and the durability and scratch resistance of the film obtained from the photo-curable coating composition may be further improved.

Further, the hollow silica particles may be included in the composition in a colloidal phase dispersed in a predetermined dispersion medium. The colloidal phase containing the hollow silica particles may contain an organic solvent as a dispersion medium.

Herein, examples of the organic solvent in the dispersion medium include alcohols such as methanol, isopropyl alcohol, ethylene glycol and butanol, etc.; ketones such as methyl ethyl ketone and methyl isobutyl ketone, etc.; aromatic hydrocarbons such as toluene and xylene, etc.; amides such as dimethylformamide, dimethylacetamide and N-methylpyrrolidone; etc.; esters such as ethyl acetate, butyl acetate and gamma-butylolactone, etc; ethers such as tetrahydrofuran and 1,4-dioxane, etc.; or a mixture thereof.

The photo-curable coating composition may include 10 to 500 parts by weight or 50 to 400 parts by weight of the hollow silica particles based on 100 parts by weight of the photopolymerizable compound. When the hollow silica particles are added in an excessive amount, the scratch resistance and abrasion resistance of the coating film may be reduced due to a decrease in the content of the binder. Further, when the hollow silica particles are added in a small amount, uniform film formation of the hollow silica particles may not be not performed, and the desired effect may not be exhibited due to the increase of the reflectance and the refractive index.

As the photopolymerization initiator, any compound known to be usable in the photo-curable coating composition may be used without particular limitation. Specifically, a benzophenone-based compound, an acetophenone-based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound.

Meanwhile, the photo-curable coating composition may further include an organic solvent.

Non-limiting examples of the organic solvent include ketones, alcohols, acetates and ethers, or mixtures of two or more thereof.

Specific examples of the organic solvent include ketones such as methyl ethyl ketone, methyl isobutyl ketone, acetylacetone or isobutyl ketone, etc.; alcohols such as methanol, ethanol, n-propanol, i-propanol, n-butanol, i-butanol or t-butanol, etc.; acetates such as ethyl acetate, i-propyl acetate, or polyethylene glycol monomethyl ether acetate, etc.; ethers such as tetrahydrofuran or propylene glycol monomethyl ether, etc.; or a mixture of two or more thereof.

The organic solvent may be added at the time of mixing the respective components to be included in the photo-curable coating composition, or may be included in the photo-curable coating composition as the respective components are added to the organic solvent in a state of being dispersed in or mixed with the organic solvent.

Meanwhile, the low refractive index layer included in the optical film of one embodiment can be obtained by coating the above-mentioned photo-curable coating composition onto the antiglare layer, and then drying and photo-curing the coated product. The specific process conditions of such a low refractive index layer may be subject to conditions that are obvious to those skilled in the art, and are specifically described even in Examples provided hereinafter, and therefore, additional description thereof will be omitted.

Another example of the above-mentioned optical film may comprise:

a light-transmitting substrate film; and an antiglare layer which is formed on the substrate film and includes a binder containing a (meth)acrylate-based crosslinked polymer, and one or more fine particle having a sub-micron (sub-μm) scale dispersed on the binder, and optionally, further comprise a primer layer formed between the substrate film and the antiglare layer, and a low refractive index layer formed on the antiglare layer.

Further, in such an optical film, the (meth)acrylate-based crosslinked polymer of the antiglare layer may be preferably a crosslinked polymer of 0 to 20 parts by weight of a monofunctional (meth)acrylate-based compound based on 100 parts by weight of the binder of the antiglare layer, and a polyfunctional (meth) acrylate compound with three or more functionalities. The polyfunctional (meth)acrylate-based compound may include a monomolecular type (meth) acrylate-based compound with three to six functionalities, and a polyurethane-based polymer, a poly(meth)acryl-based polymer, or a polyester-based polymer, having a (meth) acrylate-based functional group with ten or more functionalities. The absolute value of the refractive index difference between the fine particles of the antiglare layer and the binder may be less than 0.15.

As already mentioned above, the optical film can exhibit excellent antiglare properties, in particular, can effectively suppress scattering or reflection of external light at the surface of the image display device, and can minimize the occurrence of interference fringes derived from the substrate film, and further can exhibit excellent scratch resistance and the like. Further, the haze properties and image sharpness of the antiglare layer and the optical film can be further improved. Therefore, such an optical film can be very preferably used in various image display devices.

Meanwhile, according to another embodiment, there may be provided an image display device including the optical film described above.

An example of such a polarizing plate and an image display device can be constructed as follows.

The image display device may be a liquid crystal display device including a pair of polarizing plates facing each other; a thin film transistor, a color filter, and a liquid crystal cell sequentially stacked between the pair of polarizing plates; and a backlight unit. The image display surface of the liquid crystal display device may include the optical film of the above-described embodiment.

Advantageous Effects

According to the present invention, there can be provided an optical film which can exhibit excellent antiglare properties, in particular, can effectively suppress scattering or reflection of external light at the surface of the image display device, and can minimize the occurrence of interference fringes derived from the substrate film, and further can exhibit excellent scratch resistance and excellent adhesion between the antiglare layer and the substrate film.

Such optical film can be preferably used in various image display devices, thereby greatly improving the visibility and the like.

DETAILED DESCRIPTION OF THE EMBODIMENTS

Specific embodiments of the present invention are now described in more detail by way of the following examples. However, these examples are given for illustrative purposes only, and the scope of the present invention is not intended to be limited to or by the examples.

Preparation Example: Preparation of Composition for Forming an Antiglare Layer, and Photo-Curable Coating Composition for Forming Low Refractive Index Layer (1) Preparation of Composition for Forming an Antiglare Layer The components shown in Table 1 below were uniformly mixed to prepare a composition for forming an antiglare layer. The contents of all components used in Table 1 are shown in parts by weight.

TABLE 1

| | | Preparation Example 1 | Preparation Example 2 | Preparation Example 3 | Preparation Example 4 | Comparative Preparation Example 1 | Comparative Preparation Example 2 | Comparative Preparation Example 3 | Comparative Preparation Example 4 |
|---|---|---|---|---|---|---|---|---|---|
| Binder | OPPEA | | 5.0 | | | | 23.0 | | |
| | HEA | | | | | | | 8.5 | |
| | UA-306T | | 15.0 | 10.6 | 4.0 | | | | |
| | Beamset 371 | 7.0 | | | 8.0 | 7.0 | | | |

TABLE 1-continued

|  |  | Preparation Example 1 | Preparation Example 2 | Preparation Example 3 | Preparation Example 4 | Comparative Preparation Example 1 | Comparative Preparation Example 2 | Comparative Preparation Example 3 | Comparative Preparation Example 4 |
|---|---|---|---|---|---|---|---|---|---|
|  | 8BR-500 |  | 10.0 | 9.0 |  |  | 7.0 |  |  |
|  | TMPTA | 23.1 |  | 10.6 |  | 23.1 |  |  | 23.1 |
|  | PETA |  |  |  | 18.1 |  |  | 16.1 | 7.0 |
| Organic fine particles (refractive index) | 103BQ (about 1.52) |  | 0.5 |  |  |  |  |  |  |
|  | 113BQ (about 1.56) | 0.6 | 0.5 | 0.8 |  |  | 1.0 | 1.0 | 0.6 |
|  | 3.5 μm/ 1.555 (about 1.56) |  |  |  | 1.0 |  |  |  |  |
| Inorganic fine particles (refractive index) | 9600A (1.43) | 0.2 |  |  |  |  |  |  | 0.2 |
|  | MA-ST (1.43) | 0.2 | 0.5 | 0.2 | 0.1 | 1.0 | 0.5 | 0.1 | 0.2 |
| Initiator | I184 | 2.0 | 2.0 | 2.0 | 2.0 | 2.0 | 2.0 | 2.0 | 2.0 |
| Dispersant | BYK300 | 0.5 | 0.5 | 0.5 | 0.5 | 0.5 | 0.5 | 0.5 | 0.5 |
| Solvent | IPA | 33.2 |  | 22.1 | 33.1 | 22.2 | 33.0 | 32.8 | 33.2 |
|  | EtOH | 33.2 | 66.0 | 44.2 | 33.2 | 44.2 | 33.0 | 33.0 | 33.2 |
| Refractive index | Binder* | 1.51 | 1.55 | 1.52 | 1.53 | 1.51 | 1.58 | 1.52 | 1.51 |
|  | Organic fine particles (average) | 1.56 | 1.54 | 1.56 | 1.56 | 0 | 1.56 | 1.56 | 1.56 |
|  | Inorganic fine particles (average) | 1.43 | 1.43 | 1.43 | 1.43 | 1.43 | 1.43 | 1.43 | 1.43 |
|  | Absolute value of refractive index difference (binder & Organic fine particles) | 0.05 | 0.01 | 0.04 | 0.03 | 1.51 | 0.02 | 0.04 | 0.05 |
|  | Absolute value of refractive index difference (binder & Inorganic fine particles) | 0.08 | 0.12 | 0.09 | 0.10 | 0.08 | 0.15 | 0.09 | 0.08 |
| Total |  | 100 | 100 | 100 | 100 | 100 | 100 | 100 | 100 |

*The refractive index of the binder is measured after crosslinking (co)polymerization according to the above constitution and preparation examples described hereinafter.
1) OPPEA: o-phenylphenoxyethyl acrylate
2) HEA: 2-hydroxyethyl acrylate
3) UA-306T: (Kyoeisha): hexafunctional acrylate-based compound formed by reacting toluene diisocyanate with two pentaerythritol triacrylates
4) Beamset 371 (ARAKAWA CHEMICAL): polymer to which an epoxy acrylate functional group having about 50 or more functionalities is bonded to a polyurethane/ester backbone
5) 8BR-500 (TAISEI FINE CHEMICAL): polymer to which a urethane acrylate functional group with about 40 functionalities is bonded to a polyacryl backbone
6) TMPTA: trimethylolpropane triacrylate
7) PETA: Pentaerythritol triacrylate
8) I184 (Irgacure 184): photoinitiator, manufactured by Ciba
9) BYK 300: PDMS dispersant
10) 103BQ (XX-103BQ, manufactured by Sekisui Plastic): PMMA-PS cross-linked copolymer fine particles having a refractive index of 1.515 (about 1.52) and an average particle diameter of 2 μm
11) 113BQ (XX-1136Q, manufactured by Sekisui Plastic): PMMA-PS crosslinked copolymer fine particles having a refractive index of 1.555 (about 1.56) and an average particle diameter of 2 μm
12) 3.5 μm/1.555: spherical acrylic/styrene copolymer resin fine particles (XX-68BQ, manufactured by Sekisui Plastic Co.) having a volume average particle diameter of 3 μm and a refractive index of 1.555 (about 1.56)
13) 9600A: spherical silica fine particles (X24-9600A; Shin-Etsu) having a volume average particle diameter of 100 nm and a refractive index of 1.43,
14) MA-ST: spherical silica fine particles having a volume average particle diameter of 12 nm and a refractive index of 1.43 (manufactured by Nissan Chemical)

Example and Comparative Example: Preparation of Optical Film

As shown in Table 2 below, the antiglare layer compositions respectively prepared in Preparation Examples 1 to 4 or Comparative Preparation Examples 1 to 3 were coated onto a PET substrate film having a thickness of 100 μm and a refractive index of 1.6 to 1.7, dried at 90° C. for 1 minute, and then irradiated with ultraviolet rays of 150 mJ/cm² to prepare an antiglare layer.

Experimental Example: Measurement of Physical Properties of Optical Film

The physical properties of the optical films prepared above were measured according to the following methods, and the results are shown in Table 2 below.

1. Measurement of Refractive Index

The refractive indexes of the binder and the antiglare layer contained in the optical film were measured in a state of being coated on the wafer using an ellipsometer. More specifically, the refractive indexes of the binder, the antiglare layer and the like were measured by a method in which each composition was applied to a 3 cm×3 cm wafer, coated using a spin coater (coating condition: 1500 rpm, 30 seconds), dried at 90° C. for 2 minutes and irradiated with ultraviolet rays under the condition of 180 mJ/cm$^2$ under nitrogen purge. Thereby, each coating layer having a thickness of 100 nm was formed.

The ellipsometry was measured for the coating layer at an incidence angle of 70° over a wavelength range of 380 nm to 1000 nm by using J. A. Woollam Co. M-2000 apparatus. The measured ellipsometry data (LP, A) was fitted to a Cauchy model of the following general formula 1 using Complete EASE software so that MSE became 3 or less.

$$n(\lambda) = A + \frac{B}{\lambda^2} + \frac{C}{\lambda^4}$$

Wherein, n(λ) is a refractive index at a wavelength λ (300 nm to 1800 nm), and A, B and C are Cauchy parameters.

Meanwhile, the refractive indexes of the substrate film and the respective fine particles used information provided on the commercially available product.

2. Evaluation of the Occurrence of Interference Fringes—Evaluation of Occurrence of Rainbow Stains/Measurement of Rainbow Variation Rate In the optical films prepared in Examples and Comparative Examples, a black tape (Vinyl tape 472 Black, manufactured by 3M) was attached to the surface on which the antiglare layer was not formed so as not to transmit light, and then reflection images were taken using a three-wavelength light source. The size of the captured image was 640×480 pixels (15 cm×10 cm), and the light quantity was adjusted to the range of 70% of the maximum quantity of light emitted from the three-wavelength lamp.

The presence or absence of rainbow stains present on the surface of the optical film was observed in the images used and evaluated according to the following criteria. The evaluation results are shown in Table 2 below.

<Measurement Criteria>

○: There was no rainbow stains, or the rainbow interval is 0.2 mm or less, and rainbow was not observed compared to the complementary colors such as red and green.

X: Rainbow interval was 0.2 mm or more, rainbow was observed compared to the complementary colors such as red and green, and rainbow was recognized even with the light source of general fluorescent light.

3. Evaluation of Total/Internal Haze Value

A 4 cm×4 cm optical film specimen was prepared. The average value was calculated by measuring three times with a haze meter (HM-150, A light source, Murakami Color Research Laboratory), which was calculated as a total haze value. In the measurement, the transmittance was measured according to JIS K 7361, and the haze value was measured according to JIS K 7105. In measuring the internal haze value, an adhesive film having a total haze value of 0 was bonded to the coated surface of the optical film to be measured to make the irregularities of the surface smooth, and an internal haze value was measured in the same manner as that of the total haze value.

4. Evaluation of Gloss Value

The 20°/60° gloss value was measured using the micro-TRI-gloss manufactured by BYK Gardner Co., Ltd. At the time of measurement, a black tape (3M) was attached to the surface of the substrate film on which the coating layer was not formed so as not to transmit light. The 20°/60° gloss value was measured by varying the incidence angle of light to 20°/60°, and the average value measured five or more times was calculated as the gloss value.

5. Evaluation of Scratch Resistance

The optical film to be measured was cut into a width of 4 cm and a length of 15 cm and fixed on a scratch measuring instrument. The coated surface was then rubbed back and forth 10 times under a constant load, and it was observed whether the scratch occurred on the surface. While increasing the load in increments of 100 g, the maximum load not causing scratches was calculated as the scratch resistance evaluation result.

TABLE 2

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| Substrate film | PET | PET | PET | PET | PET | PET | PET | PET |
| Refractive index of substrate film | 1.6~1.7 (birefringence) | 1.6~1.7 (birefringence) | 1.6~1.7 (birefringence) | 1.6~1.7 (birefringence) | 1.6~1.7 (birefringence) | 1.6~1.7 (birefringence) | 1.6~1.7 (birefringence) | 1.6~1.7 (birefringence) |
| Constitution of antiglare layer | Preparation Example 1 | Preparation Example 2 | Preparation Example 3 | Preparation Example 4 | Comparative Preparation Example 1 | Comparative Preparation Example 2 | Comparative Preparation Example 3 | Comparative Preparation Example 4 |
| Primer layer | formed | formed | formed | formed | formed | formed | formed | formed |
| Thickness of primer layer (nm) | 100 | 100 | 100 | 100 | 100 | 100 | 100 | 100 |
| Rainbow | ○ | ○ | ○ | ○ | X | X | X | X |
| Total haze value (%) | 3.2 | 2.7 | 2.5 | 2.8 | 1.2 | 2.8 | 2.2 | 5.2 |
| Internal haze value (%) | 2.8 | 2.4 | 2.3 | 2.7 | 1 | 2.6 | 2 | 4.7 |
| Gloss value (20-degree) | 60.5 | 65 | 61.8 | 59.8 | 72.5 | 56.5 | 72 | 39.2 |

TABLE 2-continued

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| Gloss value (60-degree | 86 | 86.9 | 85.5 | 83.2 | 92.3 | 83.5 | 91.7 | 73.5 |
| Scratch resistance (g) | 1200 | 1200 | 1500 | 1300 | 1300 | 200 | 900 | 1200 |

Referring to Table 2, it was confirmed that the optical films of Examples 1-4 suppress the interference fringes (rainbow) derived from the substrate film, and exhibit excellent optical properties such as low gloss value and haze value and high scratch resistance.

However, it was confirmed that in Comparative Examples 1 to 4, as the monofunctional (meth)acrylate-based compound is used in an excessively high content, or the refractive index difference between the respective fine particles and the binder is 0.15 or more, or the binder is formed without using a compound having ten or more functionalities, the scratch resistance or optical properties are deteriorated, and the occurrence of interference fringes is increased.

The invention claimed is:

1. An optical film comprising:
a polyester-based substrate film,
a primer layer formed on the polyester-based substrate film, having a thickness of 20 nm to 500 nm,
an antiglare layer formed on the primer layer, including a binder containing a (meth)acrylate-based crosslinked polymer, and organic fine particles of a micron (μm) scale dispersed in the binder and inorganic fine particles of a nanometer (nm) scale dispersed in the binder, and
a low refractive index layer formed on the antiglare layer, comprising a binder resin containing a crosslinked (co)polymer of a photopolymerizable compound and a fluorine-based compound containing a photoreactive functional group, and hollow silica particles dispersed in the binder resin,
wherein the fluorine-based compound containing the photoreactive functional group has a fluorine content of 1 to 25% by weight,
wherein the polyester-based substrate film is a polyethylene terephthalate (PET)-based film having a thickness of 100 to 200 μm,
wherein the (meth)acrylate-based crosslinked polymer is a crosslinked polymer of 0 to 20 parts by weight of a monofunctional (meth)acrylate-based compound based on 100 parts by weight of the binder, and a polyfunctional (meth)acrylate-based compound with three or more functionalities,
wherein an absolute value of the refractive index difference between the organic fine particles and the binder is 0.08 to 0.15, and an absolute value of the refractive index difference between the inorganic fine particles and the binder is less than 0.15,
wherein the surface of the antiglare layer has a 20-degree gloss value of 50% to 70% and a 60-degree gloss value of 75% to 90%, and
wherein the polyfunctional (meth)acrylate-based compound comprises:
a monomolecular (meth)acrylate-based compound with three to six functionalities, and
a polyurethane-based polymer, a poly(meth)acryl-based polymer, or a polyester-based polymer, each having a (meth)acrylate-based functional group with 40 to 80 functionalities.

2. The optical film of claim 1, wherein the binder has a refractive index of 1.5 to 1.60.

3. The optical film of claim 1, wherein the organic fine particles include a polystyrene-based resin, a poly(meth)acrylate-based resin or poly(meth)acrylate-co-styrene copolymer resin.

4. The optical film of claim 1, wherein the organic fine particles are spherical particles having a particle diameter of 1 to 5 μm and have a refractive index of 1.5 to 1.57.

5. The optical film of claim 1, wherein the inorganic fine particles are metal oxide fine particles including silica, alumina, zirconia or titania.

6. The optical film of claim 1, wherein the inorganic fine particles are spherical particles having a particle diameter of 10 nm to 300 nm, and have a refractive index of 1.4 to 1.75.

7. The optical film of claim 1, wherein the organic and inorganic fine particles are each contained in an amount of 0.1 to 10 parts by weight based on total 100 parts by weight of the antiglare layer.

8. The optical film of claim 1, wherein the antiglare layer has a thickness of 1 to 10 μm.

9. The optical film of claim 1, wherein the primer layer has a refractive index smaller than a refractive index of the substrate film and larger than a refractive index of the binder of the antiglare layer.

10. The optical film of claim 1, wherein the low refractive index layer has a refractive index of 1.3 to 1.5 and a thickness of 1 to 300 nm.

11. An optical film comprising:
a light-transmitting substrate film,
a primer layer formed on the light transmitting substrate film, having a thickness of 20 nm to 500 nm,
an antiglare layer which is formed on the primer layer and includes a binder containing a (meth)acrylate-based crosslinked polymer, and organic fine particles of a micron (μm) scale and inorganic fine particles of a nano (nm) scale dispersed in the binder, and
a low refractive index layer formed on the antiglare layer, comprising a binder resin containing a crosslinked (co)polymer of a photopolymerizable compound and a fluorine-based compound containing a photoreactive functional group, and hollow silica particles dispersed in the binder resin,
wherein the fluorine-based compound containing the photoreactive functional group has a fluorine content of 1 to 25% by weight,
wherein the light-transmitting substrate film is a polyester film having a thickness of 100 to 200 μm,
wherein the (meth)acrylate-based crosslinked polymer is a crosslinked polymer of 0 to 20 parts by weight of a monofunctional (meth)acrylate-based compound based on 100 parts by weight of the binder, and a polyfunctional (meth)acrylate-based compound with three or more functionalities, wherein an absolute value of the refractive index difference between the organic fine particles and the binder of the antiglare layer is 0.08 to 0.15 and an absolute value of the refractive index difference between the inorganic fine particles and the binder is less than 0.15, wherein the polyfunctional (meth)acrylate-based compound includes a monomolecular (meth)acrylate-based compound with three to six functionalities and a polyurethane-based polymer, a poly(meth)acryl-based polymer, or a polyester-based polymer, each having a (meth)acrylate-based functional group with 40 to 80 functionalities, and wherein the surface of the antiglare layer has a 20-degree gloss value of 50% to 70% and a 60-degree gloss value of 75% to 90%.

12. An image display device comprising the optical film of claim 1.

13. The optical film of claim 1, wherein the film has a total haze value of 2.4 to 3.2%.

14. The optical film of claim 1, wherein the film has a scratch resistance of 1200-1500 g.

15. The optical film of claim 1, wherein the surface of the antiglare layer has a 20-degree gloss value of 58 to 68% and a 60-degree gloss value of 80 to 88%.

* * * * *